(12) United States Patent
Pearson et al.

(10) Patent No.: US 8,739,237 B2
(45) Date of Patent: *May 27, 2014

(54) CLOSED-CAPTIONING UNIFORM RESOURCE LOCATOR CAPTURE SYSTEM AND METHOD

(71) Applicant: AT&T Intellectual Property I, L.P., Atlanta, GA (US)

(72) Inventors: Larry B. Pearson, San Antonio, TX (US); Edward Walter, Boerne, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/644,288

(22) Filed: Oct. 4, 2012

(65) Prior Publication Data

US 2013/0055329 A1 Feb. 28, 2013

Related U.S. Application Data

(63) Continuation of application No. 11/392,079, filed on Mar. 29, 2006, now Pat. No. 8,312,497.

(51) Int. Cl.
*H04N 7/173* (2011.01)
*H04N 21/4722* (2011.01)
*H04N 21/472* (2011.01)
*H04N 21/435* (2011.01)
*H04N 21/462* (2011.01)
*H04N 21/858* (2011.01)

(52) U.S. Cl.
CPC ......... *H04N 21/4722* (2013.01); *H04N 21/472* (2013.01); *H04N 21/435* (2013.01); *H04N 21/4622* (2013.01); *H04N 21/8586* (2013.01)

USPC ............ 725/112; 725/37; 725/105; 725/109; 725/113; 725/135; 725/136

(58) Field of Classification Search
CPC ............ H04N 21/435; H04N 21/4622; H04N 21/472; H04N 21/4722; H04N 21/8586
USPC .......................................... 725/37, 110–112
See application file for complete search history.

(56) References Cited

U.S. PATENT DOCUMENTS 5,929,849 A 7/1999 Kikinis
6,061,719 A * 5/2000 Bendinelli et al. ............ 725/110

(Continued)

FOREIGN PATENT DOCUMENTS

WO 01/73525 A2 10/2001
WO 01/78381 A2 10/2001

*Primary Examiner* — Jeremy Duffield
(74) *Attorney, Agent, or Firm* — Toler Law Group, PC

(57) ABSTRACT

A particular method includes extracting uniform resource locator data from closed-captioning content using a set-top box. The closed-captioning content is included in a broadcast signal received by the set-top box. The method includes generating a web page using the set-top box. The web page includes a portion of the uniform resource data as one or more selectable links. A check box is associated with each of the one or more selectable links. The web page includes a first selectable option to enable each selectable link associated with a checked check box to be added to a uniform resource locator address book. The method also includes sending the web page from the set-top box via a local area network to a device coupled to the set-top box by the local area network in response to a request from the device for the web page.

19 Claims, 9 Drawing Sheets

(56) References Cited

U.S. PATENT DOCUMENTS

| | | |
|---|---|---|
| 6,100,890 A | 8/2000 | Bates |
| 6,169,897 B1 | 1/2001 | Kariya |
| 6,282,713 B1 | 8/2001 | Kitsukawa |
| 6,792,618 B1 | 9/2004 | Bendinelli |
| 6,928,652 B1 * | 8/2005 | Goldman ........................ 725/37 |
| 6,948,118 B2 * | 9/2005 | Genty et al. .................. 715/207 |
| 7,073,189 B2 | 7/2006 | McElhatten |
| 7,085,997 B1 * | 8/2006 | Wu et al. ....................... 715/201 |
| 2002/0059589 A1 * | 5/2002 | Park ................................ 725/35 |
| 2002/0124252 A1 * | 9/2002 | Schaefer et al. ................ 725/33 |
| 2002/0162120 A1 * | 10/2002 | Mitchell ....................... 725/135 |
| 2004/0073944 A1 * | 4/2004 | Booth .......................... 725/131 |
| 2005/0289117 A1 * | 12/2005 | Hiraishi et al. .................. 707/2 |
| 2007/0234397 A1 | 10/2007 | Pearson |

* cited by examiner

CLOSED-CAPTIONING UNIFORM RESOURCE LOCATOR CAPTURE SYSTEM AND METHOD

PRIORITY CLAIM

This application is a continuation of, and claims priority to, U.S. patent application Ser. No. 11/392,079, filed on Mar. 29, 2006, which is hereby incorporated by reference in its entirety.

FIELD OF THE DISCLOSURE

The present disclosure is generally related to processing multimedia data received via a network.

BACKGROUND

Closed-captioning (CC) refers to visual captioning on a video display that superimposes subtitles onto the display. "Captions" aim to describe all significant audio content, as well as "non-speech information," such as the identity of speakers and their manner of speaking Additionally, captions may indicate sounds other than dialog that are associated with an aspect of the video. In many broadcast applications, closed-captioning information is embedded within the broadcast signal for decoding and for display along with selected video content of the broadcast signal. The term "closed" in closed-captioning refers to the selective display of captions for only those who decode or activate them. This is distinguished from open captions, where the captions are visible to all viewers.

For live programs, spoken words included in the program's soundtrack may be transcribed by an operator, and the phonetic output can be translated into text and displayed on the screen. In some instances, the transcript may be available in advance of the broadcast, and the captions may be displayed from the available transcript information. For prerecorded programs and home videos, the audio may be transcribed and the captions can be prepared, positioned, and timed in advance.

For National Television Systems Committee (NTSC) programming, the captions are "encoded" into Line 21 of the vertical blanking interval, which is a part of the broadcast picture that is positioned above the visible portion of the picture. For the Advanced Television Systems Committee (ATSC) programming, which includes digital or high-definition broadcasts, three streams are encoded in the video: two are backward compatible Line 21 captions, and the third is a set of up to 63 additional caption streams encoded in an Electronic Industries Alliance (EIA) format, the EIA-708 format. In countries that utilize a phase-alternating line or Systeme Electronique Couleur Avec Memoire (SECAM) programming formats, where teletext is used rather than Line 21, the captions are transmitted within the broadcast stream, but using a different method.

In the United States, since the passage of the Television Decoder Circuitry Act in 1990, manufacturers of most television receivers have been required to include a closed-captioning decoder to decode the captions from the broadcast signal and to provide the decoded captions for superimposed display, when closed-captioning is enabled. For older televisions that do not include a closed-captioning decoder, a set-top box or other external decoder may be required to provide closed-captioning.

NTSC DVDs may carry closed captions in the Line 21 format which are automatically sent to the TV and turned on and off by the TV remote or the set-top decoder. Video DVDs may carry closed captions as a bitmap overlay, which can be turned on and off via the DVD player.

Recently, as more consumers have subscribed to residential broadband Internet access, users are spending increasing amounts of time browsing the Internet at home, often while watching television. However, unless closed-captioning is turned on, the consumer may miss information available via the URL data within the closed-captioning information.

DETAILED DESCRIPTION

Figure 1:
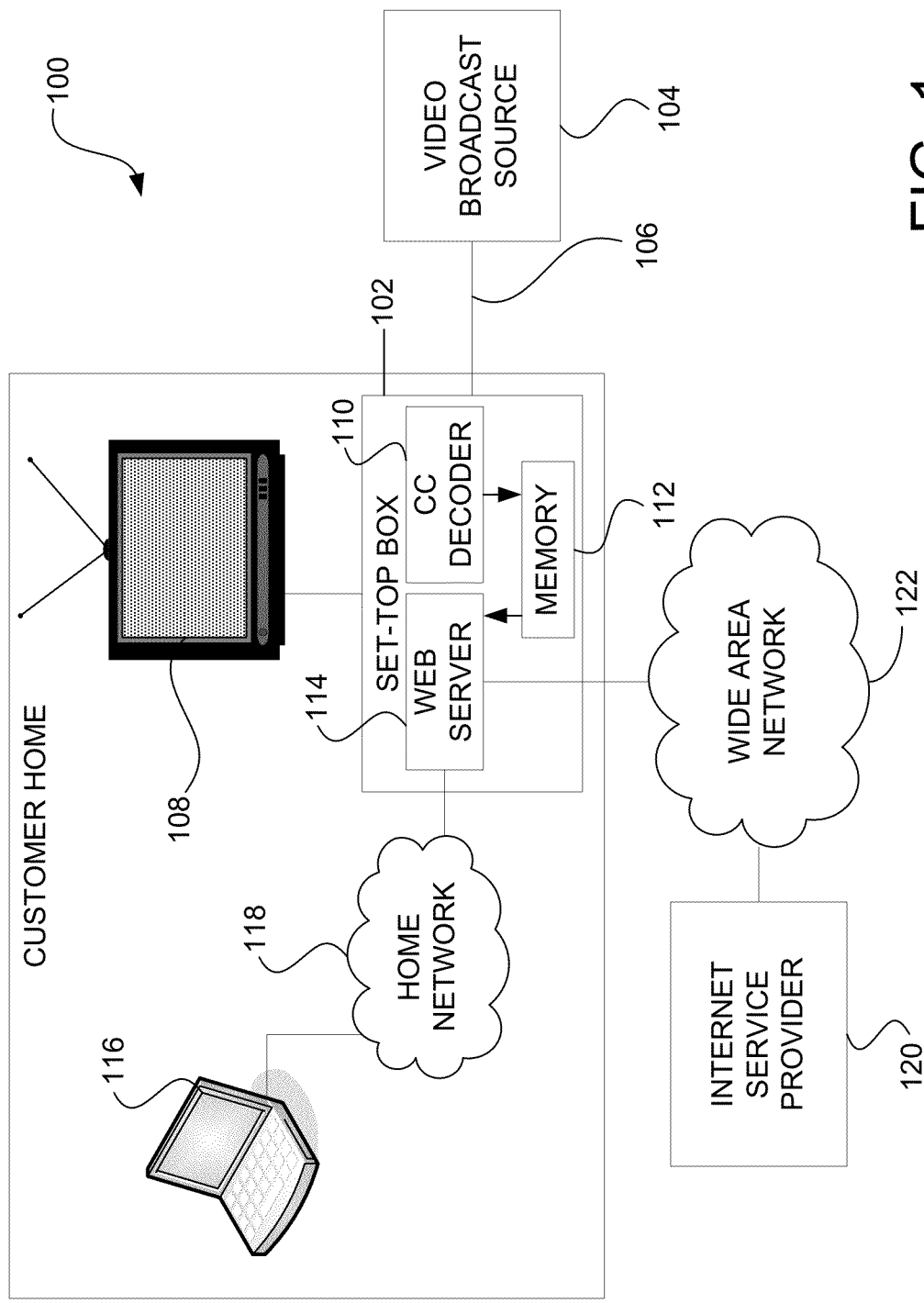
FIG. 1 is a block diagram of an illustrative embodiment of a system for extracting selected data from closed-captioning information of a broadcast signal including a set top box with a closed-captioning decoder.

In general, web site information, such as a uniform resource locator (URL), may be included in closed-captioning information from a video broadcast source as part of the broadcast signal. A set-top box is coupled to the video broadcast source via a network and is adapted to decode the closed-captioning information, to extract the URL data, and to store the URL data in a memory. The URL data may be stored in a text-based file, which may be either formatted or unformatted. The set-top box may be adapted to generate a web page including the URL data for later retrieval by a user. Additionally, the set-top box may be adapted to organize the extracted information according to a retrieval date, according to an alphabetical order, according to subject categories, or based on some other user-specified organization.

A method and a system are provided. In one embodiment, a method includes receiving at a set-top box a broadcast signal including closed-captioning content, where the closed-captioning content includes subtitles related to the broadcast signal and uniform resource locator (URL) data. The URL data is extracted from the closed-captioning content. The URL data is stored in a memory of the set-top box.

In another embodiment, a set-top box includes a memory, a receiver interface, a closed-captioning decoder, and a URL parser. The receiver interface receives a broadcast signal. The closed-captioning decoder accesses closed-captioning information including URL data from the broadcast signal and to produce an American Standard Code for Information Interchange (ASCII) character stream. The URL parser extracts the URL data from the ASCII character stream and stores the URL data in the memory.

In another embodiment, a set-top box includes a memory, a closed-captioning decoder, a processor, and a web server. The memory is adapted to store Uniform Resource Locator (URL) data. The closed-captioning decoder is adapted to retrieve closed-captioning information from a broadcast signal to produce decoded data. The processor is adapted to extract URL data from the decoded data and to store the URL data in the memory. The web server has access to the memory to generate a web page comprised of the URL data.

In another embodiment, a processor readable medium embodying processor readable instructions is provided to decode a signal to produce uniform resource locator (URL) data. The processor readable instructions include instructions to decode a broadcast signal including closed-captioning information and associated URL data to produce an American Standard Code for Information Interchange (ASCII) character stream, instructions to retrieve the URL data from the ASCII character stream, instructions to store the URL data in a memory, and instructions to generate a web page including the URL data.

In another embodiment, a method is provided. A broadcast signal is received from a video broadcasting network at a set top-box. The broadcast signal includes closed-captioning content including subtitles related to the broadcast signal and uniform resource locator (URL) data related to an address of a web site. The URL data is extracted from the closed-captioning content. The URL data is stored in a database of the set-top box.

FIG. 1 is a block diagram of an illustrative embodiment of a system 100 for extracting selected data from closed-captioning information of a broadcast signal including a set top box with a closed-captioning decoder. The system 100 includes a set-top box 102 and a video broadcast source 104 coupled by a network 106. The set-top box 102 includes a closed-captioning decoder 110, a memory 112, and a web server 114. The set-top box 102 may be connected to a display device 108, such as a television. The web server 114 may be enabled to connect to a processing device, such as a portable computer 116 via a home network 118 (wired or wireless), and may be further enabled to provide routing services to connect the portable computer 116 to an Internet service provider (ISP) 120 via a wide area network 122, such as a public switched telephone network.

In operation, the video broadcast source 104 transmits a broadcast signal, including video data, audio data, and closed-captioning information via the network 106. The closed-captioning information may include uniform resource locator (URL) data. The set-top box 102 receives the broadcast signal from the network 106 and provides the broadcast signal to the television 108, which decodes the broadcast signal for display. In some instances, the television 108 may not include circuitry to decode the broadcast signal, in which case the set-top box may decode the video signal and provide the decoded video to the television 108 for display.

Additionally, the set-top box 102 decodes and extracts or retrieves URL data from the closed-captioning information of a channel being viewed, and stores the URL data in the memory 112. Alternatively, the set-top box 102 may be adapted to store the URL data in a memory of the portable computer 116 or of another device (not shown) on the home network 118. The web server 114 may be adapted to generate and serve a web page including the URL data from the memory 112 for access by the portable computer 116 via the home network 118. A user may access the web page and select links from the web page. The web server 114 is adapted to route access requests to the ISP 120 via the wide area network 122.

Advantageously, by storing the URL data in memory 112, the set-top box 102 preserves the URL data until the user is ready to view it. Moreover, advertiser information and other data contained within the broadcast signal may be decoded and stored for later viewing and use by a user.

Figure 2:
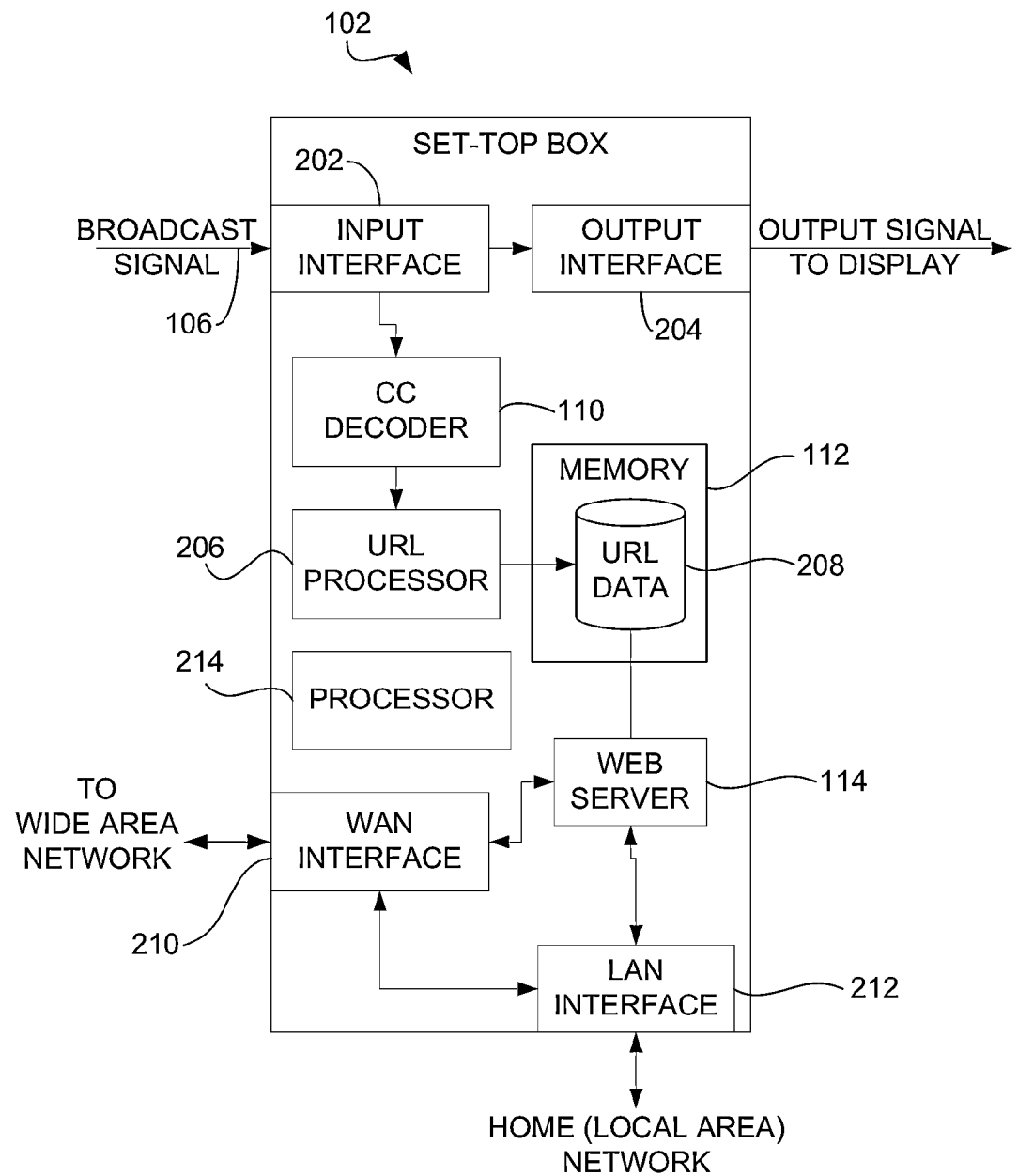
FIG. 2 is an expanded block diagram of a particular embodiment of a set top box for extraction of URL information from closed-captioning information of a broadcast signal.

FIG. 2 is an expanded block diagram of a particular embodiment of a set top box 102 adapted to extract URL data from closed-captioning information of a broadcast signal. The set-top box 102 includes an input interface 202, an output interface 204, a closed-captioning (CC) decoder 110, a memory 112, a web server 114, a uniform resource locator (URL) processor 206, URL data 208, a wide area network (WAN) interface 210, a local area network (LAN) interface 212, and a processor 214. In general, the video interface 202 includes an input coupled to the network 106 to receive a broadcast signal and includes two outputs. The output interface 204 includes an input connected to an output of the input interface 202 and an output to provide a video/audio output signal. The CC decoder 110 includes an input connected to an output of the input interface 202, and includes an output. The URL processor 206 includes an input connected to the CC decoder and an output connected to the memory 112 to write URL data 208 to the memory 112.

The web server 114 includes an input connected to the memory, an output connected to the WAN interface 210 and an output connected to the LAN interface 212. The web server 114 may be coupled to the processor 214 to process the URL data 208 from the memory 112 and to generate a web page containing the URL data 208. The web server 114 may provide the web page to a user via the LAN interface 212. Additionally, the web server 114 and/or the set-top box 102 may provide switching/routing services to route user access requests to the web server 114 or to the WAN interface 210 to access local data or to access data from the Wide Area Network, such as the Internet.

In operation, the input interface 202 of the set-top box 102 receives the broadcast signal from the network 106. The input interface 202 provides the broadcast signal to the output interface 204. In one embodiment, the output interface 204 may include a decoder to decode the broadcast signal. The input interface 202 also provides the broadcast signal to the CC decoder 110. The CC decoder decodes the closed-captioning information of the broadcast signal and provides the decoded information to the URL processor 206, which extracts the URL data from the closed-captioning information and stores the URL data 208 in the memory 112. The web server 114 generates a web page that includes the URL data 208 from the memory and allows a user to access the web page via the LAN interface 212. In one embodiment, the URL data 208 within the web page is displayed as user-selectable links that direct the user to a web page corresponding to the selected URL data. The user may select a link and the set-top box 102 may route the user to the WAN interface 210 for access to the selected URL via the Internet.

Figure 3:
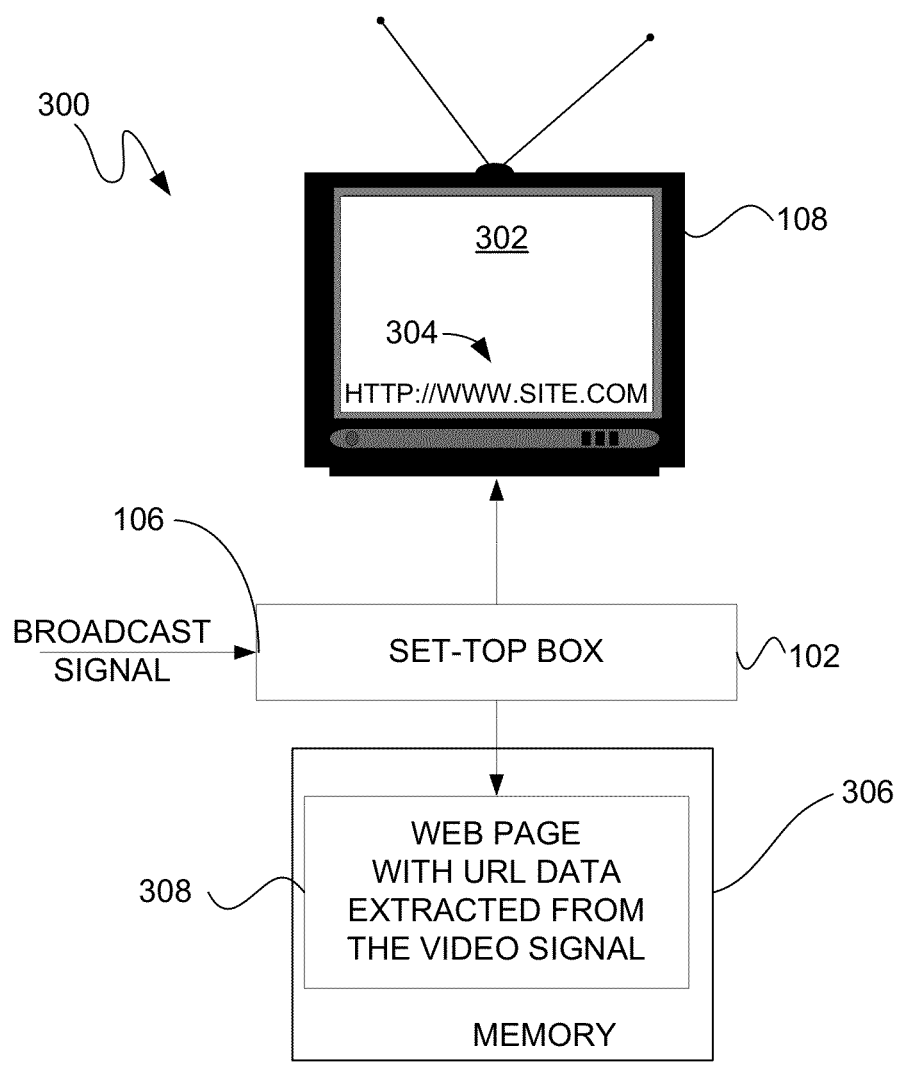
FIG. 3 is a block diagram of an alternative embodiment of a system for providing video and audio to a display and for extracting URL data from the closed-captioning information of the broadcast signal to produce a web page.

FIG. 3 is a block diagram of an alternative embodiment of a system 300 for providing video and audio to a display and for extracting URL data from the closed-captioning information of the broadcast signal to produce a web page. The system 300 includes a set-top box 102, a display device 108, and a memory 306. The set-top box 102 receives a broadcast signal from a network 106 and provides an output signal to the display, such as television 108. The television 108 displays information from the broadcast signal on the screen 302, including closed-captioning information 304 which may include URL data.

Additionally, the set-top box 102 may decode and parse the broadcast signal to extract the URL data. The set-top box 102 may process the URL data to generate a HyperText Transport Protocol (HTTP) encoded page 308 containing the URL data, formatted as user-selectable links or objects. The set-top box 102 may store the HTTP encoded page 308 in a memory 306 for later retrieval. As new URL data is received, the URL data may be added to the HTTP encoded page 308 and stored in the memory.

The memory 306 may be a memory within the set-top box 102. Alternatively, the memory 306 may be a stand-alone storage device coupled to the set-top box 102. In another embodiment, the memory 306 may be a storage device within a network computing device, such as a client computer. The set-top box 102 may be adapted to push the web page to a memory location on the client device.

Figure 4:
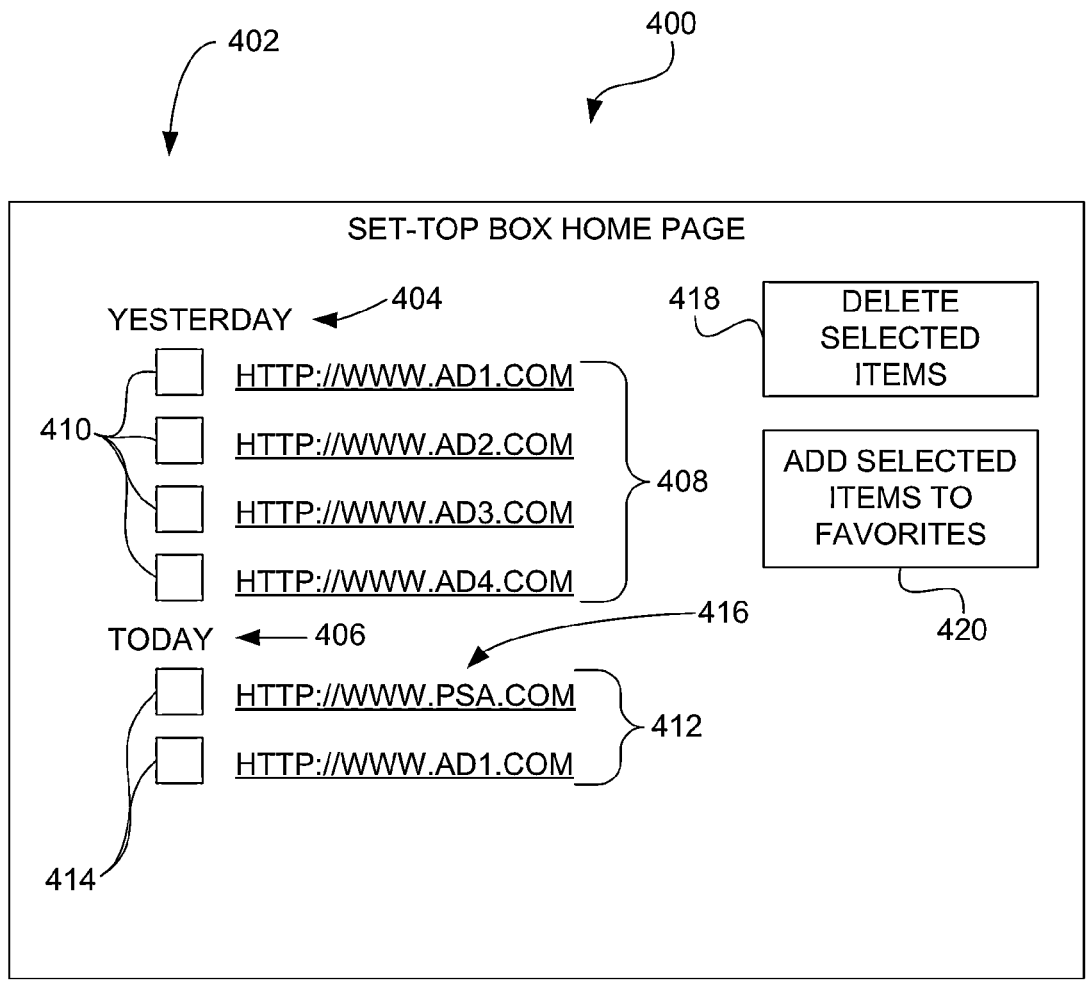
FIG. 4 is an illustration of a user interface including extracted URL data.

FIG. 4 is an illustration of a user interface 400 including extracted URL data 402. The user interface 400 is an HTTP encoded page or web page. The user interface 400 includes category headings 404 and 406, user-selectable URL data 408 and 412, user-selectable check boxes 410 and 414, and user-selectable buttons 418 and 420.

In operation, the set-top box 102 may be adapted to organize the URL data into categories and to generate the user interface 400. As shown, the categories are organized by date or day, such as YESTERDAY category 404 and TODAY category 406. The user selectable URL data 408 was extracted from a broadcast signal yesterday, while the URL data 412 was extracted a broadcast signal today. The URL data 408 and 412 are provided as clickable links. A user may select one or more of the check boxes 410 and 414, where each of the check boxes 410 and 414 are associated with one of the clickable links. The user may then add the selected URL data to his or her URL address book, such as Favorites within an Internet browser, by clicking the "Add Selected Items to Favorites" button 420, for example. The user may also delete the selected URL data by clicking a "delete selected items" button 418.

In general, the URL data 408 and 412 may include advertising information and links to corporate web pages. Additionally, the URL data 408 and 412 may include public service announcement information 416 or other URL data extracted from the broadcast signal.

Figure 5:
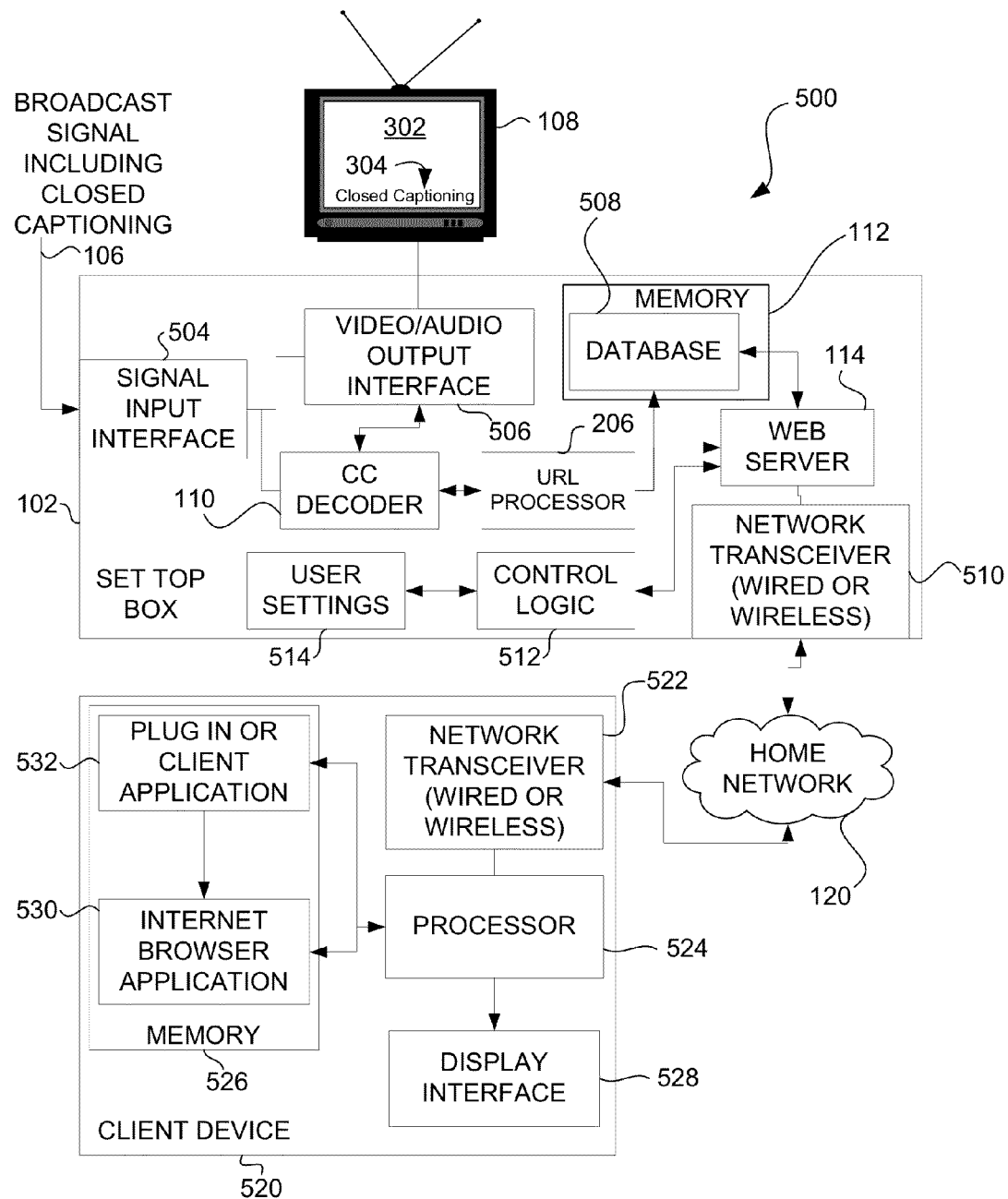
FIG. 5 is a block diagram of a system for extracting URL data from a received broadcast signal and for interfacing with a plug-in or client application on a client device to provide the extracted URL data for display.

FIG. 5 is a block diagram of a system 500 for extracting URL data from a received broadcast signal and for interfacing with a plug-in or client application on a client device to provide the extracted URL data for display. The system 500 includes a set-top box 102, a display device 108, a home network 120, and a client device 520. The set-top box 102 includes a signal input interface 504, a CC decoder 110, a video/audio output interface 506, a URL processor 206, a memory 112, a database 508, a web server 114, a network transceiver 510, control logic 512, and user settings 514. The display device 108 is a television to provide a display 302 including closed-captioning information 304. The client device 520 includes a network transceiver 522, processor 524, a memory 526, and a display 528. The memory 526 may include an Internet browser application 530 and an associated plug-in or client application 532.

The signal input interface 504 includes an input to receive a broadcast signal from a network 106 and an output. The video/audio output interface 506 is connected to the output of the signal input interface 504 to receive the broadcast signal. The CC decoder 110 includes an input that is connected to the output of the signal input interface 504 to receive the broadcast signal and one or more outputs. The video/audio output interface 506 may be connected to one of the one or more outputs of the CC decoder 110. The URL processor 206 includes an input connected to one of the one or more outputs of the CC decoder 110 and an output. The memory 112 includes an input connected to the output of the URL processor 206 and an output. The web server 114 includes an input connected to the output of the memory 112, a second input connected to the output of the URL processor 206, and two input/output ports. The network transceiver (wired or wireless) 510 includes an input connected to one of the input/output ports of the web server 114, and an output, which may be connected to a home network 120. The control logic 512 includes an input/output port connected to the user settings 514, which may be stored in a memory, such as the memory 112, and an output connected to one of the input/output ports of the web server 114.

The network transceiver (wired or wireless) 522 includes an input connected to the home network 120 and an output. The processor 524 includes an input connected to the output of the network transceiver, a input/output, and an output. The display interface 528 includes an input connected to the output of the processor. The display interface 528 may also include an output connection (not shown) to connect to a separate display device, such as a monitor. Alternatively, the display interface 528 may include a liquid crystal display or other type of viewing screen to display information to a user.

In general, the database 508 represents a data structure that facilitates rapid access to data and that supports insert functions, update functions, delete functions. Additionally, the database 508 allows for rapid changes to data. The database 508 includes, but is not limited to, indexed sequential access method (ISAM) files, binary files, flat files, relational database management systems, or any other type of data storage structure.

In operation, the signal input interface 504 of the set-top box 102 receives a broadcast signal from the network 106. The signal input interface 504 provides at least a portion of the broadcast signal to the video/audio output interface 506 and to the CC decoder 110. The video/audio output interface 506 provides a signal to the display or television 108, which produces a display 302 including the closed-captioning information 304. The CC decoder 110 decodes the closed-captioning information contained within the broadcast signal and provides the decoded closed-captioning information to the URL processor 206. The CC decoder may also provide the decoded closed-captioning information to the video/output interface 506.

The URL processor 206 extracts the URL data from the closed-captioning information and stores the URL data in the memory 112, such as within a data file or database 508. Additionally, the URL processor 206 may provide the information to the web server 114. The web server 114 is adapted to access the database 508 to retrieve URL data and to dynamically generate a web page containing the URL data. The web server 114 may provide the web page to the network transceiver 510 in response to receiving a request from the client device 520 via the home network 120.

Additionally, the set-top box 102 may include control logic 512, which may be coupled to a memory including user settings 514 and to the web server 114. The control logic 512 may provide control signals to the web server 114 to control when the web server 114 provides the web page, as well as how the web page is organized. The user settings 514 may specify a user organizational preference, such as a date order, a subject matter order, an alphabetical order, and so on. The web server 114 may generate the web page including the URL data organized according to the user settings 514 in response to control signals received from the control logic 512. In alternative embodiment, the web server 114 may access the user settings 514.

The processor of the client device 520 may execute processor readable instructions embodying the Internet browser application 530 from the memory 526, including a plug in or client application. The Internet browser application 530 may generate a request to the web server 114 to access the web page, and the web server 114 may generate the web page from the URL data stored in the database 508 in response to the request. Alternatively, the user settings 514 may specify that the user desires to have the URL page delivered automatically by the web server 114 in response to the addition of new URL data from the closed-captioning information. In such an instance, the web server 114 may interact with a plug in or client application 532 of the client device 520 to cause the Internet browser application 530 to initiate the request to the web server 114 or to retrieve and display the web page.

Depending on user preferences defined within the user settings 514, the web server 114 may passively serve a web page in response to access requests or may actively push the web page to a client device for display.

Figure 6:
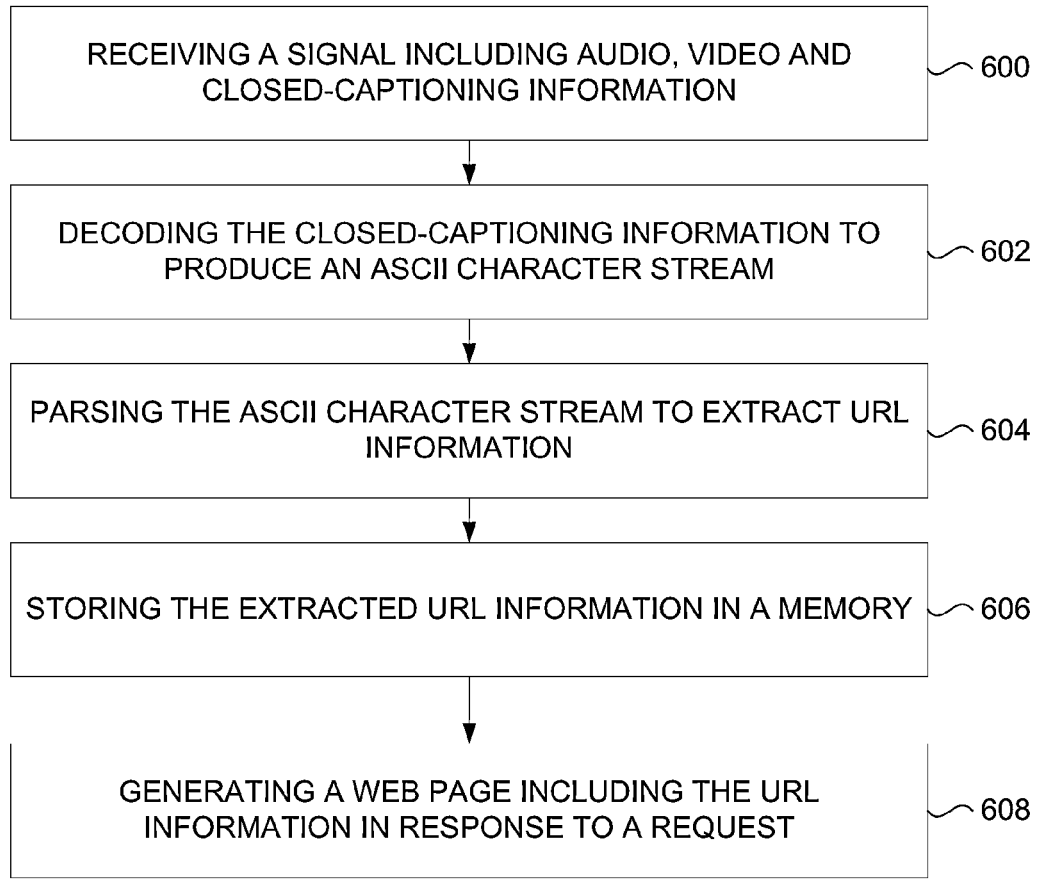
FIG. 6 is a flow diagram of a method of extracting URL data from closed-captioning information of a broadcast signal and of producing a web page or user interface based on the extracted URL data in a set top box.

FIG. 6 is a flow diagram of a method of extracting URL data from closed-captioning information of a broadcast signal and of producing a web page or user interface based on the extracted URL data in a set top box. The set-top box receives a signal including audio, video and closed-captioning information (block 600). The set-top box decodes the closed-captioning information to produce an American Standard Code for Information Interchange (ASCII) character stream (block 602). The set-top box parses the ASCII character stream to extract URL information (block 604). The set-top box stores the extracted URL information in a memory (block 606). The set-top box generates a web page including the extracted URL information in response to a request (block 608). In one embodiment, a request includes an access request from a browser application of a client device. In another embodiment, a request may include a control signal from control logic. In yet another embodiment, the request may include a user setting.

Figure 7:
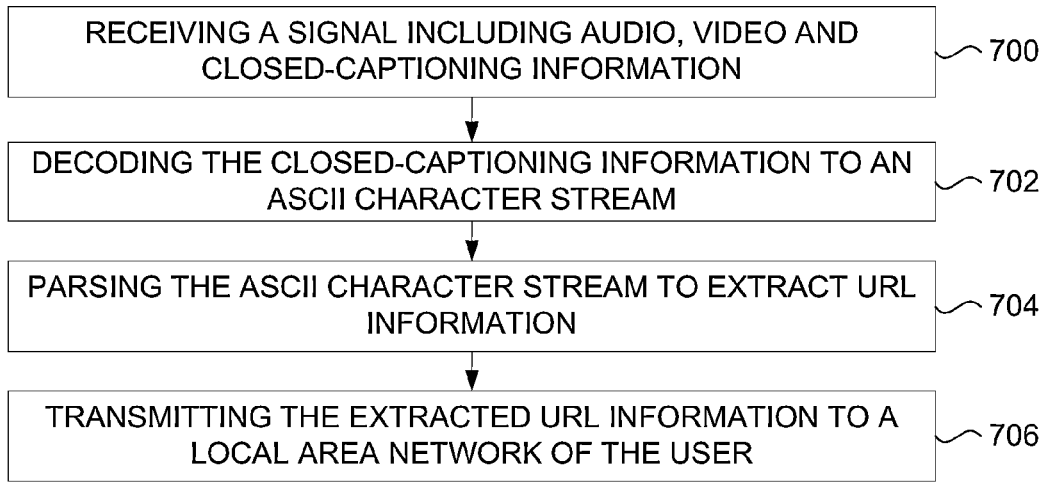
FIG. 7 is a flow diagram of a method of extracting URL data from closed-captioning information of a broadcast signal in a set top box and of providing the extracted URL data to a user.

FIG. 7 is a flow diagram of a method of extracting URL data from closed-captioning information of a broadcast signal in a set top box and of providing the extracted URL data to a user. The set-top box receives a signal including audio, video, and closed-captioning information (block 700). The set-top box decodes the closed-captioning information to produce an ASCII character stream (block 702). The set-top box parses the ASCII character stream to extract URL information (block 704). The set-top box transmits the extracted URL information to a local area network of the user (block 706).

Figure 8:
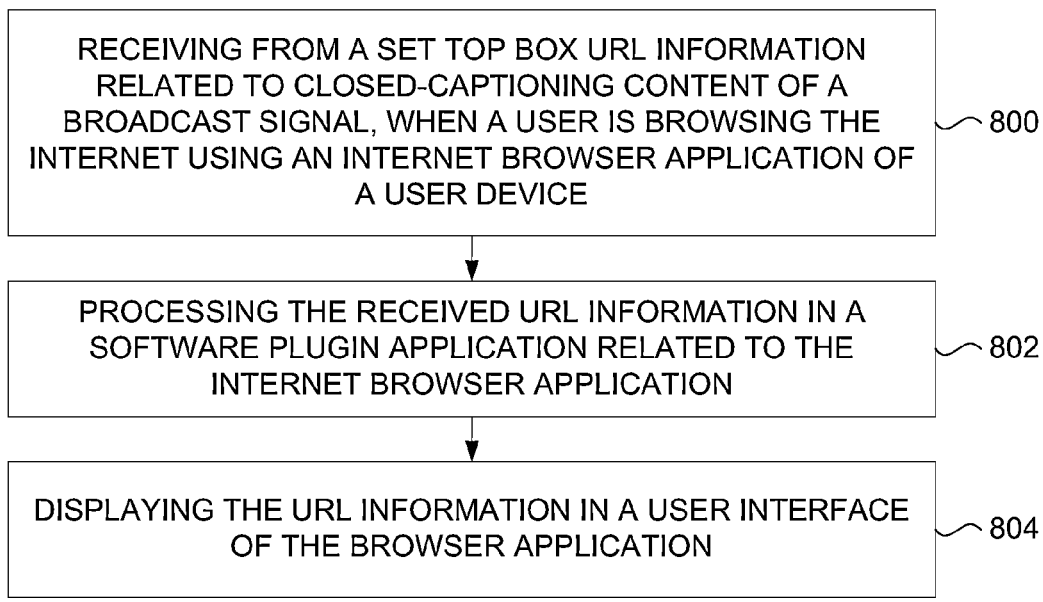
FIG. 8 is a flow diagram of a method of displaying a page including URL data received from a set-top box.

FIG. 8 is a flow diagram of a method of displaying a page including URL data received from a set-top box. The URL information related to closed-captioning content of a broadcast signal is received from a set-top box, when a user is browsing the Internet using an Internet browser application of a user device (block 800). The received URL information is processed in a software plug in application related to the Internet browser application (block 802). The URL information is displayed in a user interface of the browser application (block 804). In this embodiment, the plug in is adapted to generate a new browser window including the URL data. In an alternative embodiment, the plug in is adapted to trigger the Internet browser to generate an access request to a web server of the set-top box.

Figure 9:
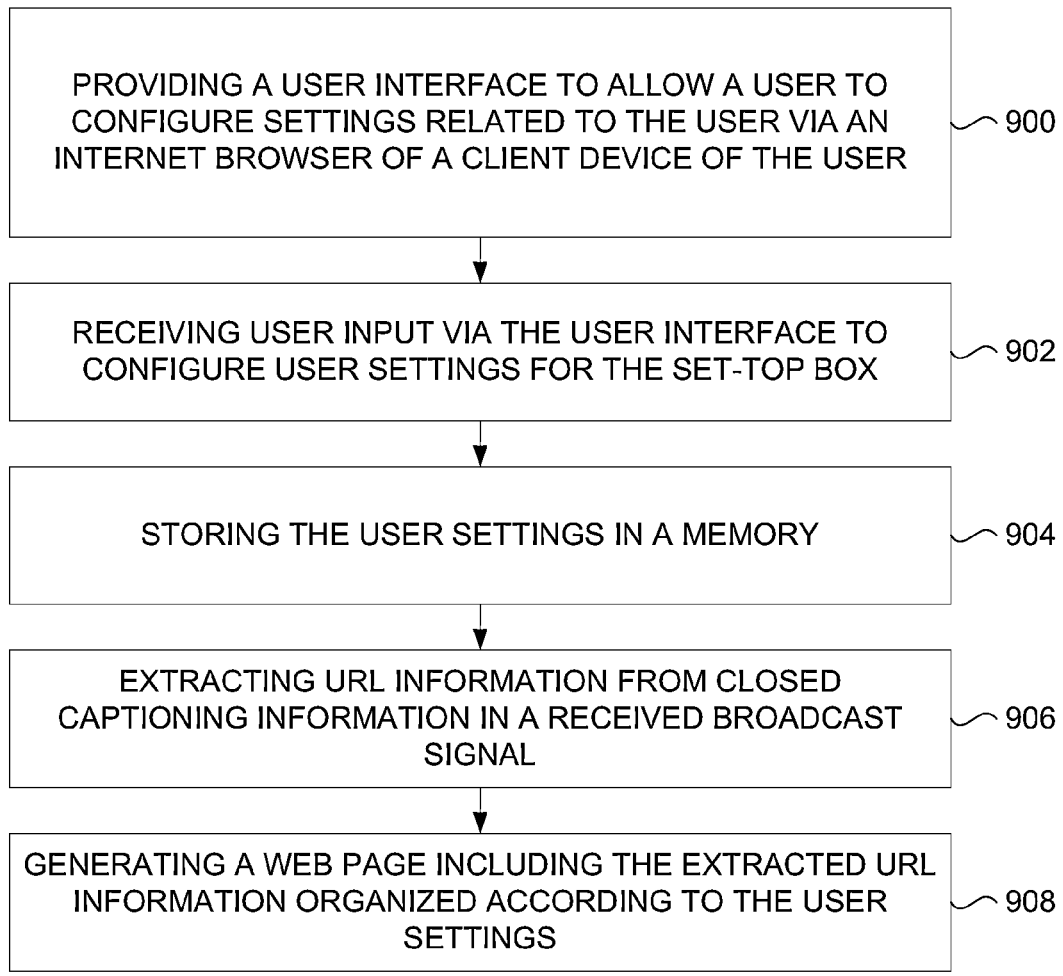
FIG. 9 is a flow diagram of a method of receiving user input related to operational settings and of providing extracted URL information to a user according to the operational settings.

FIG. 9 is a flow diagram of a method of receiving user input related to operational settings and of providing extracted URL information to a user according to the operational settings. The set-top box provides a user interface to allow a user to configure settings related to the user via an Internet browser of a client device of the user (block 900). The set-top box receives user input via the user interface to configure the user settings for the set-top box (block 902). The set-top box stores the user settings in a memory (block 904). URL information is extracted from closed-captioning information in a received broadcast signal (block 906). The set-top box generates a web page including the URL information organized according to the user settings (block 908).

Figure 10:
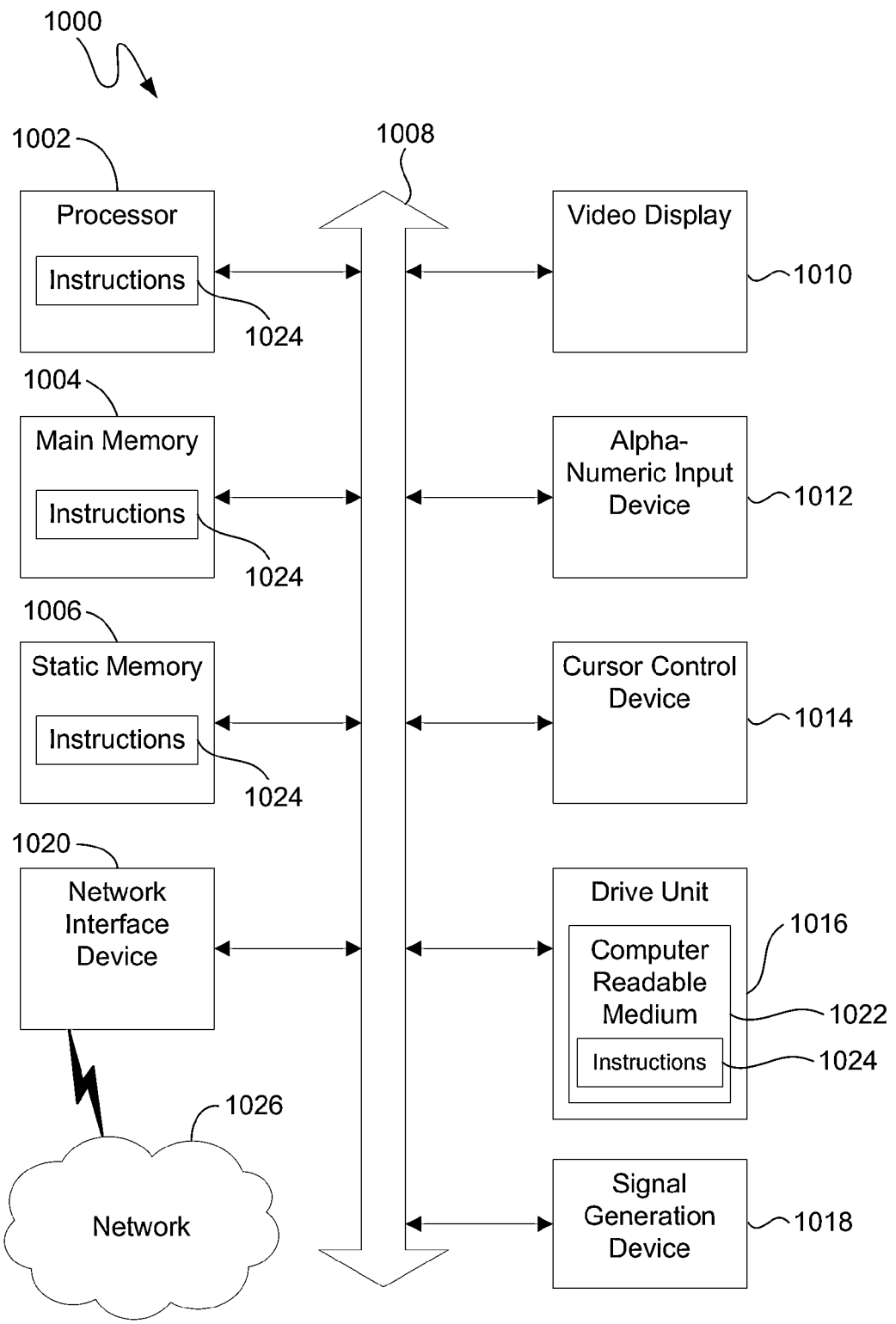
FIG. 10 is a block diagram that is representative of a general computer system on which extracted URL data may be displayed.

Referring to FIG. 10, an illustrative embodiment of a general computer system is shown and is designated 1000. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. Moreover, the computer system 1000 can include a main memory 1004 and a static memory 1006, which can communicate with each other via a bus 1008. As shown, the computer system 1000 may further include a video display unit 1010, such as a liquid crystal display (LCD), an organic light emitting diode (OLED), a flat panel display, a solid state display, or a cathode ray tube (CRT). Additionally, the computer system 1000 may include an input device 1012, such as a keyboard, and a cursor control device 1014, such as a mouse. The computer system 1000 can also include a disk drive unit 1016, a signal generation device 1018, such as a speaker or remote control, and a network interface device 1020.

In a particular embodiment, as depicted in FIG. 10, the disk drive unit 1016 may include a computer-readable medium 1022 in which one or more sets of instructions 1024, e.g. software, can be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1024 or receives and executes instructions 1024 responsive to a propagated signal, so that a device connected to a network 1026 can communicate voice, video or data over the network 1026. Further, the instructions 1024 may be transmitted or received over the network 1026 via the network interface device 1020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
at a first processor of a set-top box, extracting uniform resource locator data, including a plurality of uniform resource locators, from closed-captioning content, wherein the closed-captioning content is included in a broadcast signal received by the set-top box;
at a second processor of the set-top box:
receiving, via a user interface, settings related to an organizational preference from a client device coupled to the set-top box, wherein the organizational preference indicates a date order, a subject matter order, an alphabetical order, or a combination thereof;
storing the settings at a memory of the set-top box; and
generating a web page, wherein the web page includes a portion of the uniform resource locator data as selectable links, wherein a check box is associated with each of the selectable links, wherein the web page includes a first selectable option to enable each selectable link associated with a checked check box to be added to a uniform resource locator address book, and wherein the selectable links are organized according to the organizational preference; and
at a web server of the set-top box, sending the web page from the set-top box via a local area network to the client device coupled to the set-top box by the local area network in response to a request from the client device for the web page, wherein a user setting enables the set-top box to push the web page to the client device.

2. The method of claim 1, wherein the memory of the set-top box includes a database and wherein the uniform resource locator data is stored in the database.

3. The method of claim 2, wherein the web page includes a second selectable option to enable the uniform resource locator data that corresponds to each selectable link associated with the checked check box to be removed from the database.

4. The method of claim 1, wherein extracting the uniform resource locator data comprises:
decoding the closed-captioning content into an American standard code for information interchange character stream; and
parsing the American standard code for information interchange character stream to retrieve the uniform resource locator data.

5. The method of claim 1, wherein the device comprises a computer.

6. The method of claim 1, further comprising sending a processed portion of the broadcast signal for display at a display device coupled to the set-top box.

7. A set-top box comprising:
a closed-captioning decoder to produce decoded data from closed-captioning information of a broadcast signal;
a first processor to:
extract uniform resource locator data from the decoded data; and
a second processor to:
receive, via a user interface, settings related to an organizational preference from a client device coupled to the set-top box, wherein the organizational preference indicates a date order, a subject matter order, an alphabetical order, or a combination thereof;
store the settings at a memory of the set-top box; and
generate a web page including selectable links associated with the uniform resource locator data, wherein the web page includes a check box associated with each of the selectable links and a selectable option to enable each selectable link associated with a checked check box to be added to a uniform resource locator address book, and wherein the selectable links are organized according to the organizational preference; and
a web server to send the web page to the client device via a local area network interface in response to a request received by the set-top box from the client device, wherein a user setting enables the web server to push the web page to the client device.

8. The set-top box of claim 7, wherein the organizational preference indicates that the selectable links of the web page are to be organized by date.

9. The set-top box of claim 7, wherein the organizational preference indicates that the selectable links of the web page are to be organized by program identifiers associated with the closed-captioning information.

10. The set-top box of claim 7, wherein the closed-captioning decoder is configured to decode the closed-captioning information to produce an American standard code for information interchange character stream, and wherein the first processor is configured to parse the American standard code for information interchange character stream to extract the uniform resource locator data.

11. The set-top box of claim 7, wherein the web server is adapted to provide the client device a second website, wherein the second website includes the user interface.

12. The set-top box of claim 7, wherein the client device comprises a laptop computer.

13. The set-top box of claim 7, wherein the web page includes a second selectable option to enable each selectable link associated with the checked check box to be removed from the web page.

14. A computer readable storage device storing instruction that, when executed by a processor, cause the processor to perform operations comprising:
decoding a broadcast signal including closed-captioning information and associated uniform resource locator data to produce an American standard code for information interchange character stream;
retrieving uniform resource locator data from the American standard code for information interchange character stream, wherein the uniform resource locator data relates to a public service announcement;
receiving, via a user interface, settings related to an organizational preference from a client device coupled to a set-top box, wherein the organizational preference indicates a date order, a subject matter order, an alphabetical order, or a combination thereof;
storing the settings at a memory of the set-top box; and
generating a web page that includes selectable links based on the uniform resource locator data, wherein the web page includes a first selectable option to enable each selectable link associated with a checked check box to be removed from the web page, and wherein the selectable links are organized according to the organizational preference; and
sending the web page to the client device, distinct from the storage device, coupled to the processor in response to a request received from the client device, wherein a user setting enables the processor to push the web page to the client device.

15. The computer readable storage device of claim 14, wherein the web page is sent to a browser application of the client device in response to the request.

16. The computer readable storage device of claim 14, wherein the operations further comprise accessing a database and to store the uniform resource locator data in the database.

17. The computer readable storage device of claim 14, wherein the client device comprises a computer.

18. The computer readable storage device of claim 14, wherein the client device comprises a mobile device.

19. The method of claim 1, wherein the request is received in response to a trigger generated by a software plug-in application related to an interne browser application.

\* \* \* \* \*